United States Patent [19]

Yoshieda et al.

[11] Patent Number: 4,619,141
[45] Date of Patent: Oct. 28, 1986

[54] INSPECTION APPARATUS FOR SLIDE FASTENERS

[75] Inventors: Keiichi Yoshieda; Yuusei Sassa, both of Toyama, Japan

[73] Assignee: Yoshida Kogyo K.K., Tokyo, Japan

[21] Appl. No.: 783,667

[22] Filed: Oct. 3, 1985

[30] Foreign Application Priority Data

Oct. 17, 1984 [JP] Japan .................. 59-216407

[51] Int. Cl.$^4$ .......................................... G01M 19/00
[52] U.S. Cl. ..................... 73/865.9; 24/381; 414/223; 414/225; 414/783
[58] Field of Search ............ 73/432 V, 432 R, 432 G; 414/225, 226, 223, 783; 24/381; 901/44, 31

[56] References Cited

U.S. PATENT DOCUMENTS

| | | | |
|---|---|---|---|
| 2,195,625 | 4/1940 | Knaggs | 414/783 X |
| 2,838,831 | 6/1958 | Aubuchon | 24/381 X |
| 3,039,604 | 6/1962 | Bickel et al. | 73/432 V X |
| 3,143,217 | 8/1964 | Andersen | 414/225 |
| 3,272,349 | 9/1966 | Rudolph et al. | 414/783 X |
| 3,588,997 | 6/1971 | Field | 414/225 X |
| 3,590,982 | 7/1971 | Banyas | 414/225 X |
| 3,694,993 | 10/1972 | East | 414/783 X |
| 3,905,495 | 9/1975 | Wayne | 414/783 X |
| 4,306,659 | 12/1981 | Hakoi | 414/223 X |
| 4,372,014 | 2/1983 | Simpson | 24/576 |

FOREIGN PATENT DOCUMENTS

| | | | |
|---|---|---|---|
| 2913084 | 10/1980 | Fed. Rep. of Germany | 24/381 |
| 2132690 | 7/1984 | United Kingdom | 24/381 |
| 647053 | 2/1979 | U.S.S.R. | 414/225 |
| 676234 | 7/1979 | U.S.S.R. | 901/31 |

*Primary Examiner*—Stewart J. Levy
*Assistant Examiner*—Tom Noland
*Attorney, Agent, or Firm*—Hill, Van Santen, Steadman & Simpson

[57] ABSTRACT

An apparatus for inspecting slide fasteners is disclosed. The apparatus includes a slide fastener suspension device having a horizontal rotary member provided with a plurality of equally-spaced clips for supporting each of the slide fasteners in a suspended condition, and a drive means adapted to intermittently rotate the horizontal rotary member. A first gripper is provided at a first position along a movement path of the horizontal rotary member so as to feed in succession the slide fasteners to the clips of the suspension device in a suspended condition. The apparatus also includes a second gripper provided at a second position along the path of the horizontally rotating member so as to remove the slide fasteners from the clips transferred by the horizontal rotary member in succession. The path of the horizontal rotary member between the first position and the second position provides a visual inspection region for the slide fasteners.

7 Claims, 4 Drawing Figures

INSPECTION APPARATUS FOR SLIDE FASTENERS

BACKGROUND OF THE INVENTION

1. Field of the Art

This invention relates to improvements in an apparatus for inspecting slide fasteners in the last step of a continuous slide fastener production process and more particularly, to an inspection apparatus which allows a plurality of slide fasteners fed to the inspection apparatus in succession to be visually inspected by an operator while the slide fasteners are suspended in parallel and are being conveyed intermittently in the inspection apparatus.

2. Prior Art

It has been conventionally practiced that slide fasteners are visually inspected in the final step of a continuous production process for the slide fasteners.

In the conventional inspection procedure, the slide fasteners are fed in succession onto a belt conveyor, and the inspection is effected by an operator viewing the slide fasteners with the naked eye while the belt conveyor is continuously moved.

However, in this conventional inspection procedure, only the surface of the slide fasteners opposite from the surface of the fasteners lying on the belt conveyor is visually inspected and thus, in order to inspect the surfaces of the fasteners in contact with the belt, the fasteners have to be manually turned over which makes the inspection procedure troublesome. Since the products or slide fasteners are continually moving, the conventional inspection apparatus has the disadvantage that correct and precise inspection can not be achieved. In addition, since the slide fasteners are laid on the belt conveyor in an extended condition, the belt conveyor has a relatively large width, and thus the conventional inspection apparatus occupies a relatively large space.

SUMMARY OF THE INVENTION

Therefore, the primary object of the present invention is to provide an inspection apparatus for slide fasteners in which both surfaces of the slide fastners can be inspected by an operator without having to manually turn over the fasteners.

Another object of the present invention is to provide an inspection apparatus for slide fasteners in which the inspection can be done easily and positively by intermittently stopping a movement of the slide fasteners for inspection.

A further object of the present invention is to provide an inspection apparatus for slide fasteners in which the apparatus can be made relatively compact.

In order to accomplish the objects stated above, the present invention may be summarized as an apparatus for inspecting slide fasteners which comprises a slide fastener suspension device which has a horizontal rotary member provided with a plurality of equally-spaced clips for supporting each of the slide fasteners in a suspended condition and drive means adapted to intermittently rotate the horizontal rotary member, a first gripper which is provided at a first position along a movement path of the horizontal rotary member and which is adapted to successively feed the slide fasteners to the clips of the suspension device in a suspended condition, and a second gripper which is provided at a second position along the movement path of the horizontal rotary member and which is adapted to remove the slide fasteners from the clips in succession, the path of the horizontal rotary member between the first position and the second position providing a visual inspection region for the slide fasteners.

In the suspension device of the inspection apparatus referred to hereinabove, the horizontal rotary member may be an endless belt or chain entrained about two opposite and horizontally spaced rotary discs or pulleys, and the clips provided on the external surface of the horizontal rotary member for supporting the slide fasteners in their suspended condition each comprise a pair of opposing resilient pinch pieces for resiliently pinching one end of each slide fastener therebetween, the clips being secured to the rotating peripheral surface of the horizontal rotary member in a spaced relationship to adjacent clips, suitable for visual inspection.

The drive means adapted to intermittently rotate the horizontal rotary member may be a ratchet- or cam-driven unidirectional driving means which is adapted to intermittently move the rotary member in one direction at a time through a distance corresponding to the space between adjacent clips.

Furthermore, the first gripper is adapted to grip one end of each of the slide fasteners discharged in succession from a continuous production line for the slide fasteners, to hold them in a suspended condition, and feed them in succession to the clips of the slide fastener suspension device while the horizontal rotary member is at rest during the intermittent rotation of the rotary member. The second gripper is adapted to remove the slide fasteners in succession from the clips which have passed the visual inspection region, and place the slide fasteners in succession into a packing station while the horizontal rotary member is at rest during the intermittent rotation thereof.

Many other advantages, features and additional objects of the present invention will become apparent to persons skilled in the art upon making reference to the detailed description and the accompanying drawings in which preferred embodiments of the present invention are shown by way of illustrative example.

PREFERRED EMBODIMENT OF THE INVENTION

The present invention will be now described by way of one embodiment of the present invention illustrated in the accompanying drawings.

Figure 1:
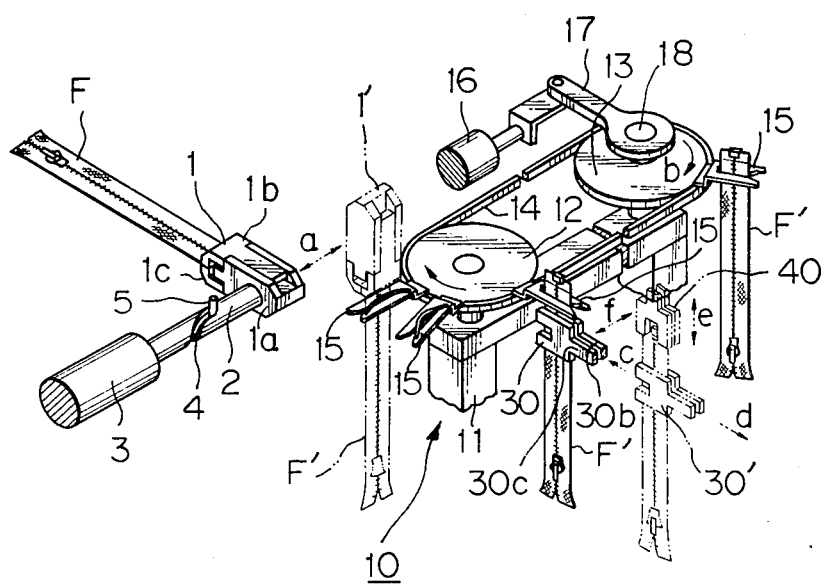
FIG. 1 is a fragmentary exploded perspective view of the principal components of the inspection apparatus for slide fasteners according to one embodiment of the present invention.
Figure 2:
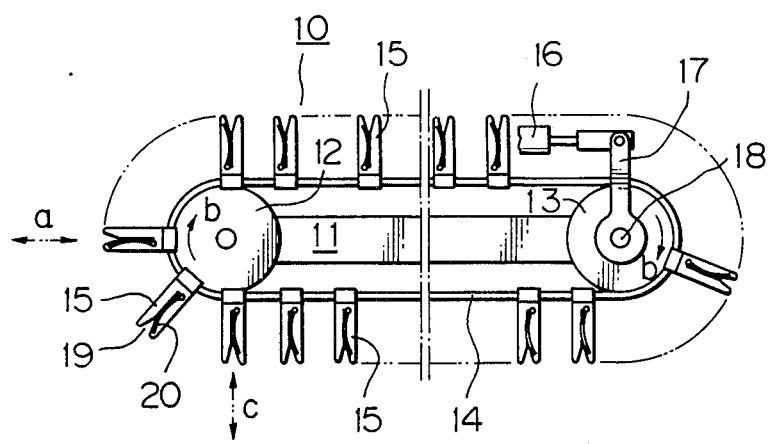
FIG. 2 is a plan view of the suspension device for the slide fasteners in the inspection apparatus.
Figure 3:
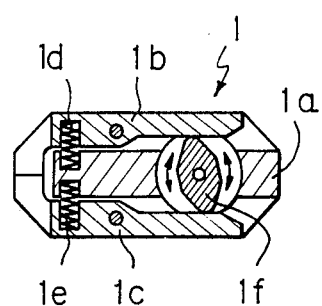
FIG. 3 is an enlarged cross-sectional view of a first gripper in the inspection apparatus.

In FIG. 1, reference number 1 denotes a first gripper supported on one end of a piston rod 2 of an air cylinder 3. The piston rod 2 is formed with a spiral cam groove 4 around the external surface thereof, and a fixed guide pin 5 is inserted in the cam groove 4. Thus, when the piston rod 2 is extended, the first gripper 1 is reorientated from a horizontal position, shown by solid lines, to a vertical position, shown by broken lines 1'. As is more clearly shown in FIG. 3, the first gripper 1 includes a support portion 1a with upper and lower jaws 1b and 1c pivoted about the support portion 1a. These jaws 1b, 1c are normally opened by the action of springs 1d, 1e, respectively, and are closed by the action of a rotary cam 1f which is actuated at a predetermined timing with respect to the action of the air cylinder 3 by a drive means (not shown).

Thus, when the air cylinder 3 is actuated, the first gripper 1 grips the leading end of a slide fastener F discharged from a continuous production line, to move the slide fastener horizontally in the direction of arrow a while reorienting the slide fastener F from a horizontal position to a vertical position, as shown by the broken line 1' so as to deliver the slide fastener to a slide fastener suspension device 10, of which description will be made hereinafter, then releases its grip from the slide fastener and finally returns to its original, solid-line position (FIG. 1) to ready itself for gripping the next slide fastener from the continuous production line.

The slide fastener suspension device 10 includes an elongated base 11, two horizontal pulleys 12, 13 provided on the base 11, and an endless belt 14 entrained about the pulleys 12, 13 for rotation and the endless belt 14 has a plurality of equally-spaced clips 15 secured to and extending outward from the external surface of the belt 14.

One of the pulleys 13 is adapted to be intermittently rotated in the direction of arrow b by means of a lever 17 which is adapted to be rocked by an air cylinder 16 and a unidirectional clutch 18, whereby the endless belt 14 is intermittently rotated.

Each of the clips 15 has an opening 19 for receiving an end of a slide fastener F therein and a spring 20 protruding into the opening 19 for resiliently pinching the end of the slide fastener. Thus, the slide fasteners F' delivered to the clips 15 by the first gripper 1 are held in a suspended condition by the clips 15.

Reference number 30 denotes a second gripper adapted to reciprocally move in the directions of arrows c and d to grip the upper portion of each slide fastener F' transferred by the suspension device 10 to remove the slide fastener F' from the clip 15 and displace the slide fastener out of the movement path of the clip 15.

Figure 4:
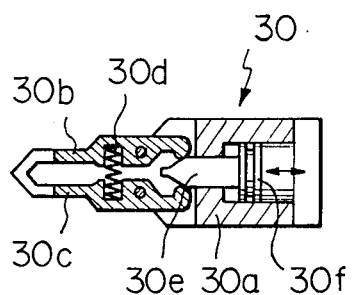
FIG. 4 is an enlarged cross-sectional view of a second gripper in the inspection apparatus.

As is more clearly shown in FIG. 4, the second gripper 30 includes a support portion 30a and a pair of jaws 30b and 30c pivoted about the support portion 30a. These jaws 30b and 30c are normally opened by the action of a spring 30d and are closed by the action of a wedge member 30e connected to a piston 30f. The piston 30f is actuated at a predetermined timing with respect to the reciprocal movement of the support portion 30a to operate the second gripper in the manner as stated above.

Reference number 40 denotes a third gripper adapted to move in the direction of arrow e to grip the upper end of the slide fastener F' transferred by the second gripper 30, and reciprocally move in the directions of arrow f to transfer to slide fastener F' from the second gripper 30 to the third gripper 40 to place the slide fastener F' into a packing station (not shown). When the third gripper 40 is reciprocated in the direction of arrow f, the second gripper 30 is further retracted in the direction of arrow d from the broken-line position so as not to interfere with the movement of the slide fastener F' gripped by the third gripper 40. An opening and closing mechanism of the third gripper 40 is similar to that of the second gripper 30 shown in FIG. 4, so the explanation thereof is omitted.

According to the present invention, it may be also contemplated that the third gripper 40 is omitted, and instead the second gripper 30 directly places the slide fastener F' into the packing station.

The visual inspection of the slide fasteners in the apparatus of the present invention is effected in the following manner while the slide fasteners are conveyed in their suspended condition by the suspension device.

Each slide fastener F discharged horizontally from the continuous production line is first gripped at the leading end thereof by the first gripper 1 and, when the air cylinder 3 is actuated, the slide fastener F is advanced in the direction of arrow a while it reoriented to a suspended position to be fed to the clip 15 of the suspension device 10, which is at that moment positioned on the pulley 12 and is at rest in its intermittent movement. When the slide fastener F is pushed into the opening 19 of the clip 15, the first gripper 1 releases the slide fastener F' from its grip and immediately returns to its original position ready for receiving and gripping the next slide fastener to be discharged from the continuous production line, and thereafter the air cylinder 16 is actuated to intermittently rotate the pulley 13 to thereby advance the endless belt 14 by a distance corresponding to the pitch of the clips 15.

By repeating the above procedure, a plurality of slide fasteners F' can be held parallel in a suspended condition by the clips 15 on the endless belt 14 in succession, and are intermittently conveyed so that an operator can easily inspect both surfaces of the slide fastener by viewing them from the opposite sides thereof until each of the slide fasteners F' reach the second gripper position. When it is found that a slide fastener or fasteners are unacceptable because of staining and/or a defect, these unacceptable fasteners can be removed from their clips 15 out of the conveying path of the fasteners.

After the inspection, when each slide fastener F' reaches the position of the pulley 12 and it is at rest during the intermittent movement thereof, the second gripper 30 which has remained in the broken-line position 30' in FIG. 1 advances in the direction of arrow c to the solid-line position 30, grips the upper portion of the slide fastener F', and then immediately returns to the broken-line position again to transfer the slide fastener to the third gripper 40. When the third gripper 40 grips the upper end of the slide fastener, the second gripper 30 releases the slide fastener from its grip and retracts further in the direction of arrow d. Thereafter, the third gripper 40 moves in the direction of arrow f to place the slide fastener in the packing station. The third gripper 40 then releases the slide fastener from its grip and thereafter immediately returns to its original position. Meantime, the second gripper 30 in its retracted position also returns to a position 30'.

Therefore, the slide fasteners which have been continuously produced are intermittently transferred by the first gripper 1, slide fastener suspension device 10, and second gripper 30 in succession. The slide fastener suspension device 10 can intermittently transfer a plurality of slide fasteners while holding them in parallel in a suspended condition, and provide a relatively along transfer path thereof for visual inspection.

Each operational component of the apparatus can be controlled in mutual relationships so that the apparatus can be easily automated.

As is clear from the foregoing description in connection with one embodiment of the present invention, according to the present invention, since a plurality of slide fasteners supplied in succession from a continuous production line are intermittently transferred by the inspection device while being maintained parallel in a suspended condition, the fasteners can be visually inspected from the opposite sides thereof easily and positively, and the apparatus itself can be compactly constructed to occupy a relatively small space.

What is claimed is:

1. An apparatus for inspecting slide fasteners comprising:
    a slide fastener suspension device having a horizontal rotary member provided with a plurality of equally-spaced clips for supporting each of said slide fasteners in a suspended condition, and a drive means adapted to intermittently rotate said horizontal rotary member;
    a first gripper which is provided at a first position along a movement path of said horizontal rotary member and which is adapted to feed in succession said slide fasteners to said clips of said suspension device in a suspended condition; and
    a second gripper which is provided at a second position along said path of said horizontally rotating member and which is adapted to remove said slide fasteners from said clips in succession;
    said path of said horizontal rotary member between said first position and said second position providing a visual inspection region for said slide fasteners.

2. The apparatus as claimed in claim 1, in which said horizontal rotary member comprises an endless belt entrained about two horizontally-spaced pulleys.

3. The apparatus as claimed in claim 2, in which said first and said second grippers are positioned about the periphery of one of said pulleys.

4. The apparatus as claimed in claim 2, in which said drive means includes a lever which is adapted to be rocked by an air cylinder and which is connected to one of said pulleys by a unidirectional clutch.

5. The apparatus as claimed in claim 1, in which said first gripper feeds said slide fasteners discharged from a continuous production line for said slide fasteners to said clips of said suspension device, and said first gripper is so constructed that it reorients each slide fastener gripped thereby from a horizontal position to a vertical position.

6. The apparatus as claimed in claim 1, in which each of said clips has an opening for receiving an end of one of said slide fasteners therein, and spring means protruding into said opening for resiliently pinching said end of said slide fastener thereby.

7. The apparatus as claimed in claim 1, further comprising a third gripper which is positioned near said second gripper and which is adapted to grip said slide fasteners removed by said second gripper and place said slide fasteners into a packing station in succession.

* * * * *